(12) United States Patent
Bernhard

(10) Patent No.: US 12,411,072 B2
(45) Date of Patent: Sep. 9, 2025

(54) METHOD FOR INSTALLING ONE OR MORE OPTICAL ELEMENTS IN A HOUSING

(71) Applicant: Endress+Hauser Conducta GmbH+Co. KG, Gerlingen (DE)

(72) Inventor: Ralf Bernhard, Stuttgart (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 371 days.

(21) Appl. No.: 18/318,339

(22) Filed: May 16, 2023

(65) Prior Publication Data

US 2023/0366808 A1 Nov. 16, 2023

(30) Foreign Application Priority Data

May 16, 2022 (DE) .................. 10 2022 112 140.2

(51) Int. Cl.

| | |
|---|---|
| *G01N 21/01* | (2006.01) |
| *G01N 15/06* | (2024.01) |
| *G01N 21/552* | (2014.01) |
| G01N 15/075 | (2024.01) |
| G01N 21/64 | (2006.01) |

(52) U.S. Cl.
CPC ............. *G01N 21/01* (2013.01); *G01N 15/06* (2013.01); *G01N 21/552* (2013.01); *G01N 15/075* (2024.01); *G01N 2021/0106* (2013.01); *G01N 2021/6432* (2013.01); *G01N 2201/0227* (2013.01)

(58) Field of Classification Search
CPC ...... G01N 21/01; G01N 15/06; G01N 21/552; G01N 15/075; G01N 2021/0106; G01N 2021/6432; G01N 2201/0227; G01N 21/31; G01N 21/4133; G01N 21/59; G01N 21/645; G01N 2015/0042; G02B 7/026; G02B 7/006; G02B 7/02
See application file for complete search history.

(56) References Cited

U.S. PATENT DOCUMENTS

| | | | |
|---|---|---|---|
| 2015/0168665 A1 | 6/2015 | Farmiga | |
| 2015/0323755 A1* | 11/2015 | Kwon | .................... G02B 7/023 359/823 |

FOREIGN PATENT DOCUMENTS

| | | |
|---|---|---|
| DE | 3635637 A1 | 7/1987 |
| DE | 102004004098 B3 | 9/2005 |

\* cited by examiner

*Primary Examiner* — Charles S Chang
(74) *Attorney, Agent, or Firm* — Christopher R. Powers; Endress+Hauser (USA) Holding, Inc.

(57) ABSTRACT

A method for installing at least one optical element in an interior space of a housing includes: clamping a sensor assembly in an interior of the housing in at least one radial clamping direction extending perpendicularly to a centering axis using at least one elastic body, wherein the sensor assembly comprises at least one optical elements, wherein each respective elastic body is inserted into a recess, which extends parallel to the centering axis and is open towards the interior space, and is clamped there such that each of the at least one elastic bodies exerts a clamping force acting in the respective radial clamping direction on an outer edge of each of the at least one optical elements of the assembly adjacent thereto in the interior space of the housing and to be clamped in the housing.

18 Claims, 4 Drawing Sheets

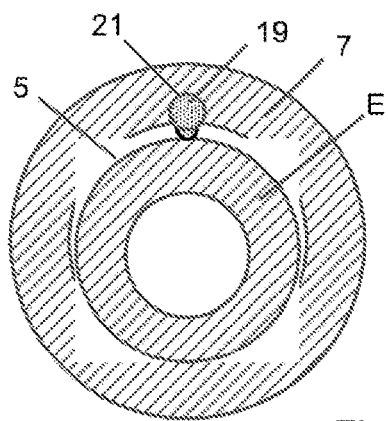
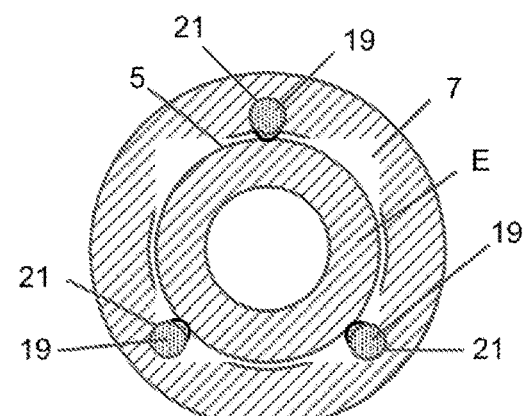
Fig. 7
Fig. 8
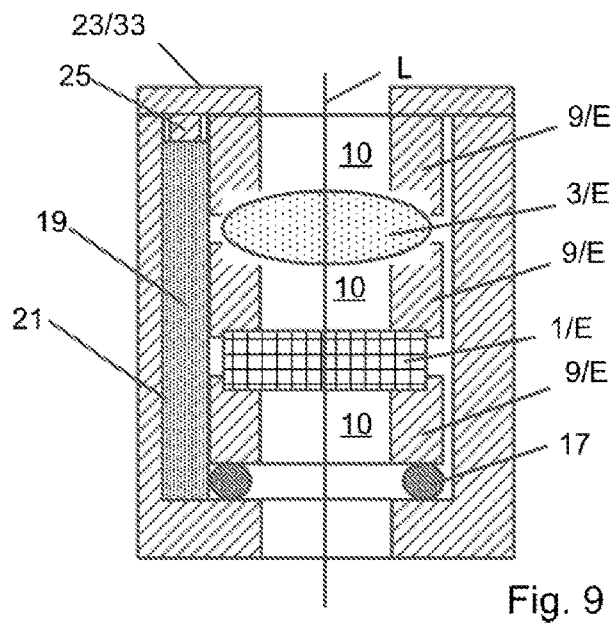
Fig. 9
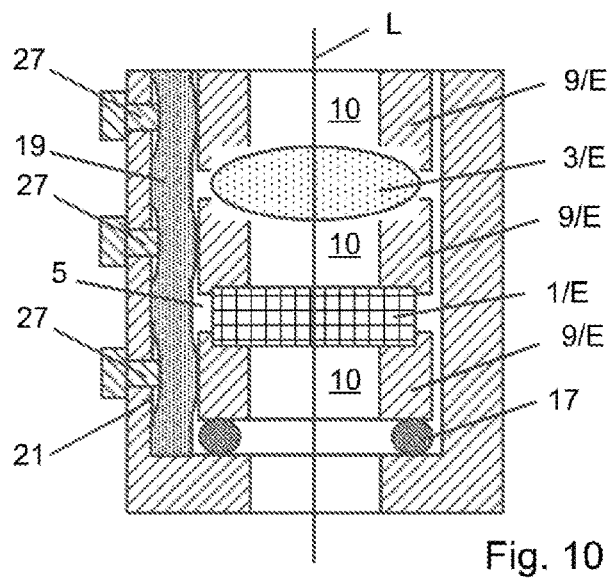
Fig. 10

METHOD FOR INSTALLING ONE OR MORE OPTICAL ELEMENTS IN A HOUSING

The present application is related to and claims the priority benefit of German Patent Application No. 10 2022 112 140.2, filed on May 16, 2022, the entire contents of which are incorporated herein by reference.

TECHNICAL FIELD

The present disclosure relates to a method for installing one or more optical elements in a housing, as well as to an optical sensor having at least one housing with at least one optical element installed therein by means of the installation method.

BACKGROUND

Optical sensors are used in a variety of different applications for measuring measured variables of media.

In measurements carried out with optical sensors, transmitted radiation is generally transmitted along a transmission path to a medium by means of a transmitting device, such as a light source, for example, the measurement radiation resulting from an interaction of the transmitted radiation with the medium being received by means of a measuring device, and on the basis of the received measurement radiation, a measurement result of a measured variable of the medium is determined and made available. With optical sensors, different measurement variables can be measured depending upon the type of interaction, such as absorption, reflection, scattering, or fluorescence. Examples known from the prior art include turbidity sensors for measuring turbidity of the medium, sensors for measuring a solids concentration contained in the medium, fluorescence sensors, sensors operating on the principle of fluorescence quenching, sensors operating on the principle of attenuated total reflection, and absorption sensors, such as for example sensors for measuring a spectral absorption coefficient or a concentration of an analyte contained in the medium.

In many optical sensors, at least one optical element, such as a filter and/or a lens, is inserted into at least one optical path of the sensor, e.g., into the transmission path and/or into a reception path, via which the measuring device receives the measurement radiation. Depending upon the type and position, these optical elements serve, for example, to eliminate interference radiation, to limit a wavelength range of the transmitted radiation and/or of the measurement radiation reaching the measuring device to a specific wavelength or a prespecified wavelength range, and/or to bring about a beam guidance of the transmitted radiation and/or measurement radiation.

Optical elements inserted into the same optical path can be arranged in a stack in a housing, with mechanical elements, such as spacers, being interposed, and held there by the mechanical elements in a position intended for them.

As regards an optimal function of the optical elements, it is desirable to install the optical elements in the housing in such a way that their optical axes correspond to a centering axis formed by the optical path. For this purpose, the optical elements, and possibly also the mechanical elements in the housing, must be arranged such that their central axes correspond to the centering axis. What is problematic in this respect is that the diameter of each of these elements must be less than the inner diameter of the interior of the housing so that the elements can be inserted into the housing. The greater the difference between the outer diameter of the elements and the inner diameter of the housing, the easier it is to insert the elements. However, the greater the difference, the greater also the radial mobility of the elements in the housing is. Accordingly, there is a risk that radial displacements of the optical axes of the optical elements relative to the optical path have a disadvantageous effect on measurement properties, especially the achievable measurement accuracy, of the sensor. The smaller the difference, the lower will be the radial mobility of the elements in the housing. However, a completely play-free assembly cannot be achieved, even when there is a very small difference.

Another problem is that the elements and the housing may have different coefficients of thermal expansion. In this case, during temperature fluctuations, thermomechanical stresses can occur which can affect the position and/or the optical properties of the optical elements. This problem, for example, can be countered by inserting an O-ring between the outer edges of the mechanical elements and the inner wall of the housing. These O-rings can, for example, be inserted into a groove provided for this purpose in the respective mechanical element. However, O-rings must be installed in a slightly compressed state in order for them to then be able to compensate for changes in the radial distance between the respective mechanical element and the inner wall of the housing caused by temperature fluctuations. This makes it difficult to install the mechanical elements. Another problem is that the O-rings, though centering the mechanical elements in the housing in the radial direction, do not provide any axial guidance. To prevent the center axes of the mechanical elements from tilting relative to the centering axis, at least two O-rings spaced apart from one another in the axial direction would have to be used for each mechanical element. However, each further O-ring leads to a further difficulty in the installation of the mechanical elements.

SUMMARY

It is an object of the present disclosure to provide a method for installing one or more optical elements in a housing, by means of which a positioning of the optical elements that is play-free and has long-term stability can be achieved in a simple manner, in particular even in the case of changing temperatures.

For this purpose, the present disclosure comprises a method for installing one or more optical elements in an interior of a housing, in which an assembly is introduced into the interior of the housing in a direction running parallel to a centering axis, wherein the assembly comprises either a single element formed by the single optical element to be installed in the housing or two or more elements arranged one on top of the other in a stack in the direction of the centering axis, wherein the elements arranged in the stack comprise the single or each optical element to be installed in the housing, and the assembly in the housing is clamped in at least one radial clamping direction running perpendicular to the centering axis by means of at least one elastic body, in which the respective elastic body, in an axial direction running parallel to the centering axis, is inserted in a recess running in the housing parallel to the centering axis and open towards the interior of the housing, and is then clamped in such a way that it exerts a clamping force acting in the respective radial clamping direction on an outer edge of the, of at least one, or of each element of the assembly that is adjacent thereto in the interior of the housing and which is to be clamped in the housing.

The method has the advantage that the or each elastic body is clamped only after axial insertion, and thereby the radial clamping of at least one element of the assembly is effected. In this case, a play-free positioning of the assembly and thus also of the or of each optical element is also achieved via the elastic body or bodies, said positioning in particular having long-term stability even in the case of changing temperatures, when the distance between the outer edge of the or of each element of the assembly and the inner wall of the housing is so great that the elements can be inserted into the housing without problems.

A first embodiment is characterized in that the elements of the assembly comprise at least one mechanical element, and the optical element, at least one of the optical elements, or each optical element in the stack is in each case adjacent to at least one mechanical element or is arranged between two mechanical elements.

An embodiment of the first embodiment is characterized in that:
- the, at least one, or each mechanical element forms in each case one of the elements of the assembly to be clamped in the housing, which is clamped in the at least one radial clamping direction, and/or
- the mechanical elements, between which the optical element or in each case one of the optical elements is arranged, form the elements of the assembly that are to be clamped, which are clamped in each case in the at least one radial clamping direction.

A second embodiment provides that:
- the housing has a shoulder surface which extends radially inwards and surrounds on all sides externally an opening of the housing,
- the assembly be arranged on the shoulder surface or on an elastic component arranged on the shoulder surface or an elastic component designed as a seal, as an O-ring, or as a shaped seal, and/or
- the uppermost element of the stack lying opposite the shoulder surface form the or one of the elements to be clamped of the assembly that is clamped in at least one radial direction.

A third embodiment provides that the assembly be clamped in three or more radial clamping directions in that, for each of the radial clamping directions, in each case at least one of the elastic bodies in the axial direction is inserted into the housing in an axial direction into one of the recesses distributed around the centering axis, and is then clamped in such a way that, on the, on at least one, or on each element of the assembly, which is arranged in the housing and is to be clamped in the housing, it in each case exerts a clamping force acting in one of the radial clamping directions.

A fourth embodiment provides that, after insertion into the recess or into one of the recesses, the or each elastic body be clamped in a direction running parallel to the centering axis by means of a clamping device which acts in the axial direction, by means of a cover installed from the outside onto an outer surface, surrounding an open end of the recess, of the housing, by means of a displacement body inserted into an end region of the recess, or by means of a pressure screw screwed into an end of the recess.

A fifth embodiment provides that
- the elastic body, at least one of the elastic bodies or each elastic body, after being inserted into the housing, or after it has been clamped in the axial direction after insertion, be clamped in each case by means of at least one clamping device acting in a radial direction perpendicular to the centering axis in the direction of the centering axis,
- wherein the or each clamping device acting in the radial direction is inserted in each case into the housing from the outside through a housing wall of the housing at a height at which the or one of the elements of the assembly to be clamped in the housing is arranged in the interior of the housing, and/or comprises a displacement body which can be moved through the housing wall into the recess at this height or a pressure screw which can be screwed into the recess through the housing wall at this height.

A sixth embodiment provides that:
- before the elastic body or at least one of the elastic bodies in each case is clamped, an incompressible intermediate piece or an incompressible intermediate piece formed as a sheet metal strip be in each case arranged in the housing on an outer side of the respective elastic body, said outer side facing away from the centering axis, and
- the respective elastic body be then clamped by means of at least one clamping device which acts in a radial direction perpendicular to the centering axis in the direction of the centering axis and which is inserted into the housing from the outside through a housing wall of the housing at a height at which the or one of the elements of the assembly to be clamped in the housing is arranged in the interior of the housing.

A seventh embodiment provides that, for each radial clamping direction in which the at least one element of the assembly to be clamped in the housing is clamped in the housing, a single, rod-shaped, elastic body be inserted into the housing and clamped there.

An eighth embodiment provides that in each case a stack sequence of the or at least one of the elastic bodies and at least one rigid body in the axial direction be inserted into the or each recess in such a way that in each case one of the elastic bodies is located at the height of the or of each element that is arranged in the housing and is to be clamped in the housing.

A further embodiment provides that the or each element of the assembly that is to be clamped in the housing have in each case external dimensions which are dimensioned such that a radial distance between an outer edge of the respective element and the housing wall after the insertion of the assembly into the housing is each case 0.05 mm to 0.5 mm.

Embodiments are characterized in that:
a) the assembly comprises at least one element designed as a mechanical element, wherein the mechanical elements are designed as spacers, holders, and/or surrounds, via the height of which, running parallel to the centering axis, an installation height of the or of each optical element within the housing is adjustable, and/or by means of which the or each optical element is fixed in its position relative to the mechanical elements, and/or wherein each mechanical element has in each case a central through-opening or a central through-opening which is aligned in the stack concentrically with an optical axis of each optical element, through which the electromagnetic radiation can pass,
b) the or each recess is in each case closed at one end, is designed as a guide channel, which, over its axial height, is connected to the interior space of the housing via a gap running in the axial direction, and/or is designed as a blind hole, which has been introduced into a housing wall surrounding the interior space of the housing externally in such a way that its cross-sectional area comprises a partial area projecting into the interior space, and/or c) the optical elements comprise at least one optical element designed as a filter and/or at least one optical element designed as a lens.

A further embodiment provides that the assembly be held or clamped in the housing in a direction running parallel to the centering axis by means of a fastening device or a cover installed from the outside on an outer surface of the housing surrounding that opening of the housing through which the arrangement was inserted into the housing, which cover extends over an outer edge region of the assembly.

Furthermore, the present disclosure comprises an optical sensor having at least one housing with at least one optical element installed in the respective housing by means of the method according to the present disclosure, in which each housing is arranged in the sensor in such a way that an optical path runs through the or each optical element arranged in the respective housing.

One embodiment comprises a sensor, with:
a transmitting device, which is designed to transmit electromagnetic transmitted radiation along an optical path, designed as a transmission path, to a medium, and
a measuring device, which is designed to receive measurement radiation resulting from an interaction of the transmitted radiation with the medium,
in which the optical path designed as a transmission path and/or an optical path designed as a reception path, via which the measuring device receives the measurement radiation, in each case runs through the housing or one of the housings.

Further embodiments provide that the optical sensor be designed as a turbidity sensor, be designed as a sensor for measuring a solids concentration contained in a medium, be designed as a fluorescence sensor, be designed as a sensor operating on the principle of the fluorescence quenching, be designed as a sensor operating on the principle of attenuated total reflection and designed to carry out transmission measurements as absorption sensor, be designed as a sensor for measuring a spectral absorption coefficient of a medium or a concentration of an analyte contained in a medium, or be designed as a sensor for measuring a refractive index of a medium.

BRIEF DESCRIPTION OF THE DRAWINGS

The present disclosure and its advantages will now be explained in detail using the figures in the drawing, which show several exemplary embodiments. The same elements are indicated by the same reference numbers in the figures.

FIG. 7 shows a cross-sectional drawing of the housing of FIG. 3 or 6 with an elastic body clamped therein;

FIG. 8 shows a cross-sectional drawing of the housing of FIG. 3 or 6 with three elastic bodies clamped therein;

FIG. 9 shows the housing of FIG. 4 with an elastic body clamped therein in the axial direction by means of a displacement body;

FIG. 10 shows the housing of FIG. 4 with an elastic body which has several regions clamped in the radial direction;

DETAILED DESCRIPTION

Figure 1:
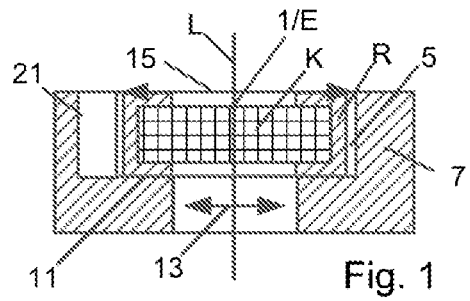
FIG. 1 shows a housing with an optical element arranged in its interior.

The present disclosure relates to a method for assembling one or more optical elements 1, 3 in an interior space 5 of a housing 7, as well as an optical sensor with at least one housing 7, in that at least one optical element 1, 3 is installed by means of the installation method described here.

The optical elements 1, 3 to be installed by means of the installation method comprise, for example, a single optical element 1, such as an element designed as a filter or as a lens. Alternatively, they can, however, also comprise two or more optical elements 1, 3, such as at least one optical element 1 designed as a filter and/or at least one optical element 3 designed as a lens.

Figure 4:
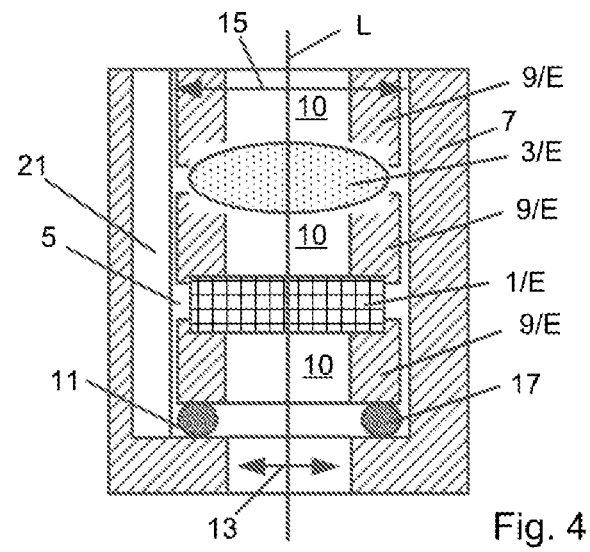
FIG. 4 shows a housing with a stack of optical and mechanical elements arranged in its interior space.
Figure 2:
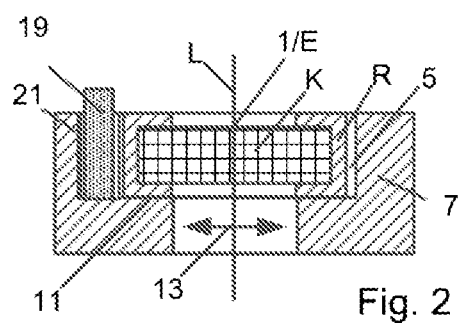
FIG. 2 shows the housing of FIG. 1 together with an elastic body inserted therein in the axial direction.
Figure 5:
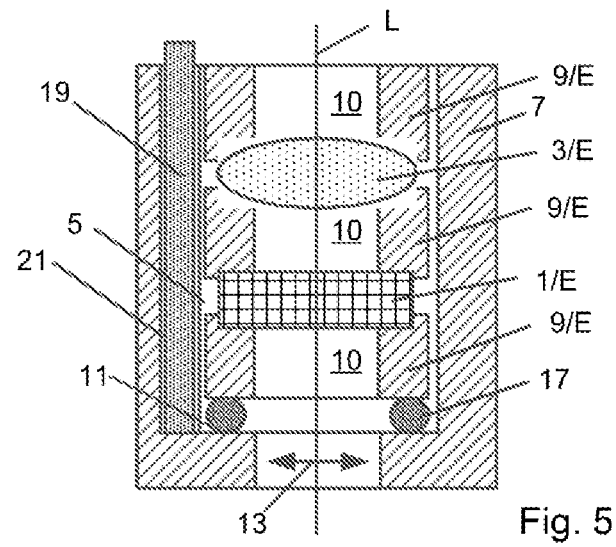
FIG. 5 shows the housing of FIG. 4 together with an elastic body inserted therein in the axial direction.
Figure 3:
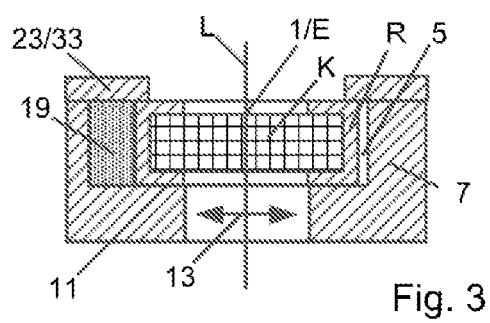
FIG. 3 shows the housing of FIG. 1 together with an elastic body clamped therein in the axial direction by means of a cover.
Figure 6:
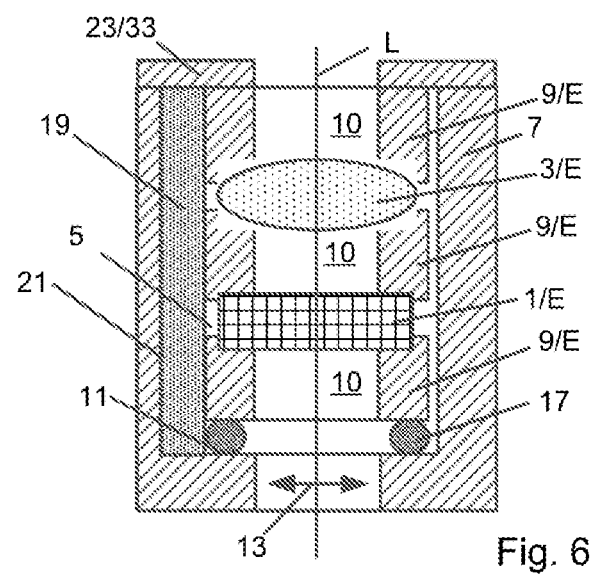
FIG. 6 shows the housing of FIG. 4 together with an elastic body clamped therein in the axial direction by means of a cover.

The individual method steps of the method are shown in FIGS. 1 through 3 by way of example using the example of a single optical element 1 to be installed in the housing 7 and in FIGS. 4 through 6 by way of example using the example of two optical elements 1, 3 to be installed in the housing 7. Similarly, three or more optical elements OE, 1, 3 can also be installed in the housing 7.

During the installation of the or of each optical element 1, 3 in the housing 7, in a first method step illustrated in FIGS. 1 and 4, the procedure is such that an assembly which comprises the or each optical element 1, 3 to be installed in the housing 7 is introduced into the interior space 5 of the housing 7 in an axial direction that runs parallel to a centering axis L.

As shown in FIGS. 1 and 4, the procedure here is such that an optical axis of the or of each optical element 1, 3 runs in each case parallel to the centering axis L after the assembly has been introduced. Depending upon the design, the centering axis L can correspond to a longitudinal axis of the housing 7. The latter is not, however, absolutely necessary, especially since the centering axis L can also run in particular parallel to the longitudinal axis of the housing 7, and possibly even run at an angle to the longitudinal axis of the housing 7, and/or a housing 7 without a pronounced longitudinal axis can be used.

In the case of only a single optical element 1 to be installed in the housing 7, the assembly, as shown in FIG. 1, is designed, for example, in such a way that it comprises only a single element E in the case formed by the single optical element 1.

Alternatively, however, the assembly can also comprise two or more elements E arranged one on top of the other in a stack. In this case, the elements E of the assembly arranged one on top of the other in the stack in the direction of the centering axis L comprise the only or each optical element 1, 3 to be installed in the housing 7. In this embodiment, the elements E of the assembly arranged in the stack can optionally comprise at least one mechanical element 9 in addition to the or each optical element 1, 3. If the elements E of the assembly comprise at least one mechanical element 9, the stack is produced, for example, by arranging the elements E of the assembly one on top of the other such that the optical element 3 or at least one of the optical elements 1, 3 in the stack is in each case adjacent to at least one mechanical element 9. As shown in FIGS. 4 through 6, the arrangement in the housing 7 in this embodiment can be constructed, for example, in such a way that the, at least one, or each optical element 1, 3 is arranged in the stack between two mechanical elements 9 in each case.

With regard to the function of the optical elements 1, 3, each mechanical element 9 has a central through-opening 10 through which electromagnetic radiation can pass. In FIG. 4, the through-openings 10 in the stack are in each case aligned concentrically with the optical axes of the optical elements 1, 3. Optionally, a window transparent to electromagnetic radiation can be inserted into the through-openings 10.

The mechanical elements 9 are designed, for example, as spacers, via the height of which, running parallel to the centering axis L, an installation height of the or of each optical element 1, 3 is adjustable within the housing 7. Alternatively or in addition thereto, the mechanical elements 9 are designed, for example, as holders and/or as surrounds, by means of which the or each optical element 1, 3 is in each case fixed in the stack in its position relative to the mechanical elements 9. This can be effected, for example, in the manner shown in FIG. 4, in that the mechanical elements 9 in each case have at least one recess into which an outer edge of the or of one of the optical elements 1, 3 can be inserted or is inserted.

Assuming that the single, at least one, or each optical element 1, 3 has at least a minimum mechanical stability, it is, however, also possible to dispense with the use of mechanical elements 9. FIG. 1 shows an example in which the minimum mechanical stability is brought about by an outer edge region R of the optical element 1, which is mechanically stable at least in sections and which surrounds an optical component K of the optical element 1, such as, for example, a filter element shown in FIG. 1 or a lens body. The installation height of the or of each optical element 1, 3 within the housing 7 can in each case be set here exclusively or additionally by means of a corresponding adaptation of an overall height of its edge region R. In FIG. 1, the edge region R of the optical element 1 is designed as an independent component, e.g., as a frame or as a surround into which the optical component K is inserted—for example, glued in or screwed in. Alternatively, the optical component K and the edge region R can, however, also be designed as one-piece component or be connected to one another in some other way. An example of this are one-piece lenses which comprise a lens body and an edge region surrounding the lens body.

In the examples shown in FIGS. 1 and 4, a shoulder surface 11 is adjacent to an end of the housing wall externally surrounding the centering axis L on all sides, which shoulder surface extends radially inwards and externally surrounds on all sides one of the two, mutually opposite openings 13, 15 of the housing 7. Accordingly, the assembly, as shown in FIG. 1, can be arranged in the housing 7 in such a way that it rests directly on the shoulder surface 11 in the housing 7. FIG. 4 shows an alternative embodiment in which the assembly is arranged on an elastic component 17, such as a seal, an O-ring, or a shaped seal, which is arranged on the shoulder surface 11 before the installation of the assembly. The elastic component 17, which can also be used analogously in FIG. 1, offers the advantage that, after completion of the installation, it protects the optical element 1 or the optical elements 1, 3 arranged in the stack from thermomechanical stresses.

After the introduction of the assembly into the housing 7, the assembly in the housing 7 is clamped in at least one radial clamping direction running perpendicular to the centering axis L in the direction of the centering axis L by means of at least one elastic body 19, such as an elastomer, for example. For this purpose, the respective elastic body 19 is inserted into the housing 7 in the axial direction, e.g., parallel to the centering axis L, and is then clamped in such a way that it exerts a clamping force acting in the respective radial clamping direction on an outer edge of the, of at least one, or of each element E of the assembly, which element is adjacent thereto in the interior space 5 of the housing 7 and which is to be clamped in the housing 7.

A minimum stability of the outer edge of the respective element E, which is required for the radial clamping achievable in this way of the element E of the assembly adjacent to the respective elastic body 5 in the interior 19 and to be clamped in the housing 7, is readily given in the case of elements E designed as a mechanical element 9 to be clamped, and can be ensured in the case of elements E designed as an optical element 1, 3, for example, in the manner described above.

If the assembly, as shown in FIG. 1, comprises only a single element E formed by the single optical element 1, the clamping force acting in the respective radial clamping direction is exerted on the outer edge of this optical element 1. FIG. 2 shows in this regard the housing 7 shown in FIG. 1 with the assembly arranged therein after the insertion of the elastic body 19. FIG. 3 shows the housing 7 shown in FIG. 1 with the assembly arranged therein, after clamping of the elastic body 19 inserted in the axial direction.

If the assembly has two or more elements E, at least one of the elements E will be clamped in at least one radial direction in the housing 7 in each case by the clamping force acting on its outer edge in the respective radial clamping direction. Here, for example, the procedure is optionally such that at least the uppermost element E, opposite the shoulder surface 11, of the stack is clamped in the housing 7 by the clamping force acting on its outer edge in the respective radial clamping direction. The radial clamping of the uppermost element E offers the advantage that thereby all other elements E arranged in the stack are also fixed at the same time in their position between the shoulder surface 11 and the uppermost element E in the axial direction running parallel to the centering axis L. Alternatively or additionally thereto, it is of course also possible for at least two, only selected, or all elements E of the assembly in the housing 7 to be clamped in at least one radial direction.

FIGS. 5 and 6 show an exemplary embodiment in which only the elements E of the assembly taking the form of mechanical elements 9 are clamped in at least one radial direction. This embodiment offers the advantage that the or each optical element 1, 3 is better protected against forces acting thereupon, and is in this respect particularly advantageous in particular when the assembly comprises at least one optical element 1, 3 which is sensitive to mechanical and/or thermomechanical stresses. FIG. 5 shows in this regard the housing 7 shown in FIG. 4 with the assembly arranged therein, after the insertion of the elastic body 19. FIG. 6 shows the housing 7 shown in FIG. 6 with the assembly arranged therein, after clamping of the elastic body 19 inserted in the axial direction.

Regardless of the type and number of elements E clamped in at least one radial direction, all elements E of the assembly have external dimensions adapted to a cross-sectional area of the interior space 5. The outer dimensions of the element E or of each element E to be clamped in at least one radial direction are here in each case dimensioned such that a radial distance between the outer edge of the respective element E arranged in the assembly in the housing 7 and the housing wall is in each case 0.05 mm to 0.5 mm. If the assembly, in addition to the element E to be clamped, comprises at least one further element E, such as, for example, the optical elements 1, 3 shown in FIGS. 4 through 6, the outer dimensions of the or of each further element E, for example, will in each case be dimensioned such that a radial distance between the outer edge of the respective element E arranged in the stack in the housing 7 and the housing wall is substantially greater than the radial distance between the outer edge of each element E to be clamped or clamped in the housing 7 and the housing wall.

In order to accommodate the or each elastic body 19, the housings 7 shown in FIGS. 1 through 6 each have at least one recess 21 extending in the housing 7 in the axial direction parallel to the centering axis L, which recess is open towards the interior space 5 of the housing 7 over its entire length or at least in sections. The or each recess 21 is designed, for example, as a guide channel which facilitates the axial insertion of the elastic body 19, and which, over its axial height, is connected to the interior space 5 of the housing 7 via at least one gap running in the axial direction in each case. FIGS. 1 through 6 show in this regard an example in which the recess 21 is closed at one end. The recess 21 is designed, for example, as a blind hole, which has been introduced into the housing wall which externally surrounds the interior space 5 of the housing 7 and thus also the assembly arranged therein, such that the cross-sectional area of the hole comprises a partial area projecting into the interior space 5.

For the installation of the or of each optical element 1, 3, it is already sufficient if the assembly is clamped only in a single radial clamping direction. In this case, a single recess 21 is already sufficient into which at least one elastic body 19 is inserted in the axial direction and then clamped in such a way that it in each case exerts the clamping force acting in the radial clamping direction on the, at least one, or each element E of the assembly to be clamped that is arranged in the housing 7. FIG. 7 shows a cross-sectional drawing of the housing 7 shown in FIGS. 3 and 6 in a sectional plane extending through the or an element E of the assembly which is clamped in the housing 7, and which results when the housing 7 has only a single recess 21 for receiving at least one elastic body 19. As shown in FIG. 7, an eccentric clamping of the element E is effected in this case by the clamping force exerted by the clamped elastic body 19 on the element E adjoining it in the radial clamping direction.

Alternatively, the arrangement can be clamped in two, three, or more radial clamping directions by a corresponding clamping of the or of each element E to be clamped. In this case, at least one elastic body 19 is inserted in each case in the axial direction into the housing 7 for each radial clamping direction and is then clamped in such a way that it exerts a clamping force acting in the respective radial clamping direction on the or on each element E of the assembly which is arranged in the housing 7. In this case, the housing 7 has, for example, for each of the radial clamping directions a recess 21 for receiving at least one elastic body 19. The above statements apply correspondingly to these recesses 21. The clamping of the assembly by three or more clamped elastic bodies 19 distributed around the mechanical element 9 offers the advantage that a concentric clamping of the assembly, and thus also of each optical element 1, 3 arranged in the housing 7, is brought about as a result. FIG. 8 shows in this regard a cross-sectional drawing of the housing 7 shown in FIGS. 3 and 6 in a sectional plane extending through the element E, which is clamped in the housing 7, and which results when the housing 7 has three recesses 21, into which at least one of the elastic bodies 19 has been inserted in the axial direction and then clamped.

With regard to the design and the number of elastic bodies 19, FIGS. 2 and 3 and FIGS. 5 and 6 in each case show an example in which a single, rod-shaped, elastic body 19 is inserted in the axial direction into the or into each recess 21.

As shown in FIGS. 3 and 6, the clamping of the or of each elastic body 19 is effected by, for example, the elastic body 19 being clamped in the recess 21 in an axial direction running parallel to the centering axis L by means of a clamping device acting in the axial direction. The axial clamping causes the elastic body 19 to expand in the radial direction into the interior space 5. In this case, a part of the elastic body 19 bulges out of the recess 21 in a direction directed radially in the direction of the centering axis L. As a result, one or each section of the part of the elastic body 19, which section bulges out of the recess 21 and is arranged at the height of an element E to be clamped that is adjacent to it in the interior space 5, exerts in each case a radial clamping force on the element E arranged at the corresponding height in the interior space 5.

If the elastic body 19 in the initial state shown in FIGS. 2 and 5 has a length that is greater than the axial length of the recess 21, it will be suitable as a clamping device which acts in the axial direction, e.g., a cover 23 shown in FIGS. 3 and 6, which cover is installed from the outside on an outer surface, surrounding the open end of the recess 21, of the housing 7. Alternatively, however, a displacement body 25 can also be used as a clamping device acting in the axial direction, which displacement body is installed on the housing 7 such that it projects into an end region of the recess 21 that is open at the end or fills out this end region. A pressure screw which can be screwed into the open end of the recess 21 is suitable, for example, as a displacement body 25. FIG. 9 shows a modification of FIG. 6 as a further example, in which the displacement body 25 is fastened to the cover 23. Alternatively, however, the displacement body 25 can also be designed as a component part of the cover 23 or as a pressure screw screwed through the cover 23.

Figure 11:
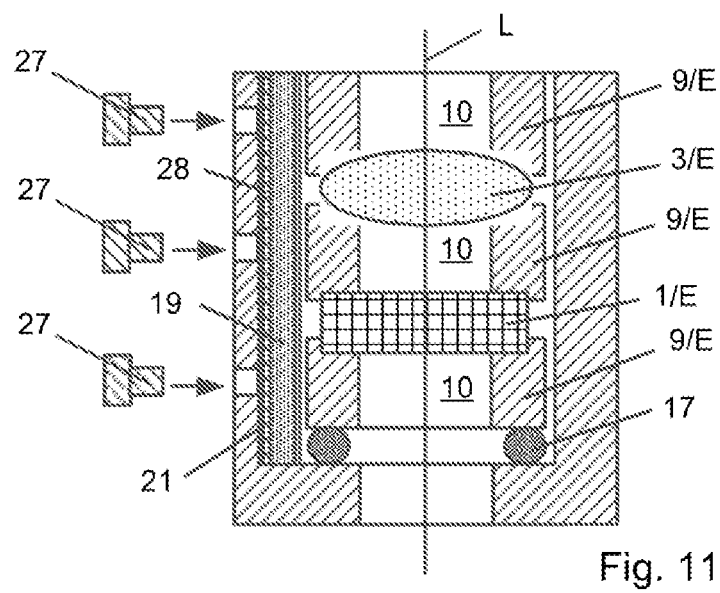
FIG. 11 shows the housing of FIG. 4 with an axially inserted elastic body and an intermediate piece.

Alternatively or in addition to the axial clampings shown in FIGS. 3, 6, and 9, the clamping of the, of at least one, or of each elastic body 19 can, however, also be effected or co-effected in each case by at least one clamping device which acts in a radial direction perpendicular to the centering axis L in the direction of the centering axis L. In this case, the clamping device or each clamping device acting in the radial direction is inserted in each case from the outside through the housing wall at a height into the housing 7 at which the or one of the elements E of the assembly to be clamped is arranged in the interior space 5 of the housing 7. In this case, the or each clamping device acting in the radial direction is designed in such a way that, via a region of the elastic body 19 which is clamped in the radial direction by means of the clamping device which acts in the radial direction, a radial clamping force is exerted on the element E that is to be clamped and is arranged at this height. Exemplary embodiments for this purpose are shown in FIGS. 10 and 11 by way of example for the arrangement shown in FIGS. 3 through 6, in which the elements E of the assembly, which are designed as mechanical elements 9, are clamped in the housing 7. These embodiments can also be used analogously for differently structured assemblies and/or for clamping the, at least one, or each element E of the respective assembly, which is in each case designed as an optical or as a mechanical element and which is to be clamped in the housing 7.

FIG. 10 shows, as an example, clamping devices acting in the radial direction for each mechanical element 9 arranged in the housing 7, each of which has a displacement body 27 which is movable in the radial direction from the outside through the housing wall and into the recess 21 at the height of the respective mechanical element 9, through which displacement body a force acting in the radial direction is exerted on a region of the elastic body 19 adjoining the displacement body 27. Suitable displacement bodies 27 are, for example, pressure screws which can be screwed from the outside through the housing wall and into the recess 21. Each of the clamping devices, which act in the radial direction and are shown in FIG. 10, cause a part of the region of the elastic body 19 adjoining the displacement body 27 in the respective recess 21 to bulge out of the recess 21 in the radial direction and exert a radial clamping force on the element 9 that is to be clamped and is arranged in the interior space 5 at the height of the region of the elastic body 19.

FIG. 11 shows a modification of the example shown in FIG. 10 after the insertion and before the clamping of the elastic body 19. As shown in FIG. 11, before the clamping of the, of at least one, or of each elastic body 19, an incompressible intermediate piece 28 is in each case arranged in the housing 7 on an outer side, facing away from the centering axis L, of the elastic body 19. The intermediate piece 28 offers the advantage that it distributes the force, subsequently exerted thereon by the or by each clamping device acting in the radial direction, onto a larger area of the elastic body 19 adjoining said intermediate piece. In exactly the same way as the elastic body 19, the intermediate piece 28 is also inserted in the axial direction into the associated recess 21 in the housing 7. A strip-shaped element, such as a sheet metal strip, for example, is suitable as the intermediate piece 28. The intermediate piece 28 has, for example, a length which corresponds to the axial height of the recess 21.

Purely axial clamping of the or of each elastic body 19, such as, for example, the clampings shown in FIGS. 3, 6, and 9, offers the advantage that no additional openings in the housing wall are required for this purpose. Radial clampings of the or of each elastic body 19, such as, for example, the clampings shown in FIGS. 10 and 11, offer the advantage that the clamping forces are applied in a targeted manner to the or to each individual element E of the assembly to be clamped in the housing 7. Combined clampings in which the or at least one of the elastic bodies 19 is in each case axially clamped in a first step and then also radially clamped in a second step offer the advantage that thereby a higher clamping force can be exerted on the elements E to be clamped. The latter is particularly advantageous when the radial distance between the outer edges of the elements E to be clamped and the housing wall of the housing 7 is comparatively large. Even in the case of combined clampings of the, of at least one, or of each elastic body 19, the axial clamping is effected, for example, in the manner illustrated in FIG. 3, 6, or 9, and each radial clamping, for example, in the manner shown in FIG. 10 or 11.

Figure 12:
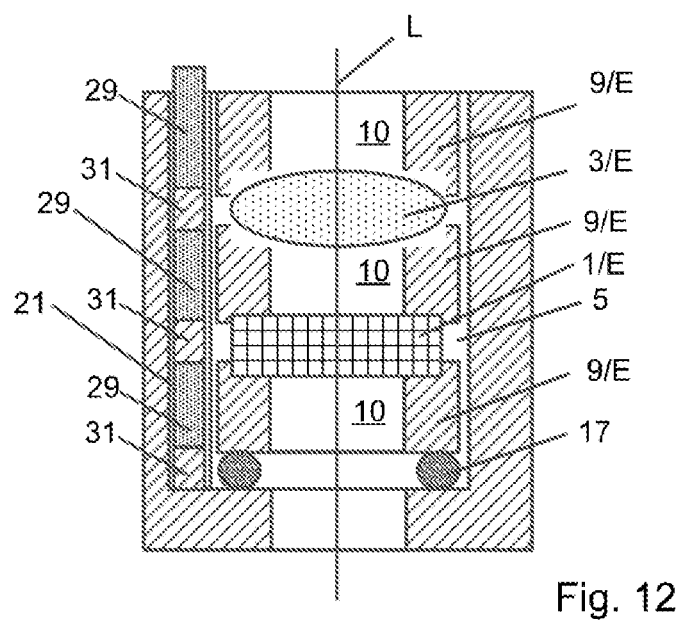
FIG. 12 shows the housing of FIG. 4 together with a stack sequence of elastic and rigid bodies inserted therein in the axial direction.

As shown in FIGS. 3, 6, 9, 10, and 11, in each case a single, rod-shaped, elastic body 19 can be inserted into the or into each recess 21 and be clamped there in the axial direction and/or at at least one height in each case in the radial direction. Alternatively, for the or for each radial clamping direction in which the assembly is subsequently clamped, a stack sequence of at least one elastic body 29 and at least one rigid body 31 can, however, also be inserted into the housing 7 in the axial direction into the respective recess 21. In this case, each stack sequence is created in such a way that in each case one of the elastic bodies 29 is located at the height of the or of each element E, arranged in the housing 7, of the assembly to be clamped. An example of elastic and rigid bodies 29, 31 arranged alternately one on top of one another in the stack sequence is shown in FIG. 12. Similar to the previous exemplary embodiments, the housing 7 shown in FIG. 12 also has at least one, and preferably three or more, recesses 21, into which one of the stack sequences is inserted in each case.

In exactly the same way as in the previous exemplary embodiments, here too each element E of the assembly that is to be clamped in the housing 7 for clamping the assembly is clamped in at least one radial clamping direction extending perpendicular to the centering axis L in the direction of the centering axis L, this being effected by means of one of the elastic bodies 31. For this purpose, the respective elastic body 29 is clamped in such a way that it exerts a clamping force acting in the radial clamping direction on the outer edge of the element E that is to be clamped and is arranged at the height of the elastic body 29 in the interior space 5 of the housing 7. Similar to the previous exemplary embodiments, here too the elastic bodies 29 are clamped, for example, in the axial and/or radial direction. In this case, the axial clamping of each elastic body 29 arranged in the or in one of the stack sequences is effected in each case by the entire stack sequence being clamped in the axial direction. Suitable for this purpose are the clamping devices acting in the axial direction, which have already been described in connection with FIGS. 3, 6, and 9. The radial clamping of the elastic bodies 29 is effected, for example, by means of the clamping devices shown in FIGS. 10 and 11 which act in the radial direction.

The stack sequences offer the advantage that a more targeted and thus more efficient conversion of the clamping forces exerted by means of the clamping devices into the radial clamping forces acting on the elements E to be clamped can be achieved via the axial lengths and the sequence of the elastic bodies 29 and the rigid body 31 in the stack sequence.

As described above, it can be achieved by a corresponding selection of the element E to be clamped or of the elements E to be clamped of the assembly that the installation method described here also effect an axial fixing of the or of each element E of the assembly in the housing 7. In this case, a further axial fixing, fastening, or clamping of the assembly is not absolutely necessary. However, it may then be useful, in particular, for the housing 7 with the optical elements 1, 3 installed therein, to be used subsequently in a sensor, which, under certain circumstances, is exposed to vibrations or impact forces.

A reinforcement of the axial fastening of the or of each element E of the assembly in the housing 7 can optionally be achieved, for example, by the assembly being held in the housing 7 in a direction extending parallel to the centering axis L by means of a fastening device 33, or even being clamped in the axial direction. Such a fastening 33 can, of course, analogously also be used if it is not ensured, by the selection of the element E to be clamped or of the elements E to be clamped, that each element E of the assembly is fixed in the axial direction.

A suitable fastening device 33 is, for example, a cover, which is installed from the outside on an outer surface of the housing 7 surrounding the opening 15 of the housing 7 through which the assembly has been inserted into the housing 7 and which extends over an outer edge region of the assembly. As shown in FIGS. 3, 6, and 9, this fastening device 33 can also be used, for example, in the manner described above in the example of the cover 23, at the same time also for the axial clamping of the or of each elastic body 19, 29. In embodiment variants in which the elastic body 19, 29 or at least one of the elastic bodies 19, 29 is in each case clamped exclusively by or at least also by means of one of the clamping devices which act in the radial direction and are shown in FIGS. 10 and 11, the radial clamping of the elastic bodies 19, 29 preferably takes place after the installation of the fastening device 33.

As mentioned above, the present disclosure also comprises an optical sensor, such as an optical sensor for measuring a measured variable of a medium, which comprises at least one housing 7 with at least one optical element 1, 3 installed therein by means of the previously described installation method. In this case, the or each housing 7 is in each case arranged in the sensor in such a way that an optical path P1, P2 passes through the optical element 1, 3 installed in the respective housing 7.

Figure 13:
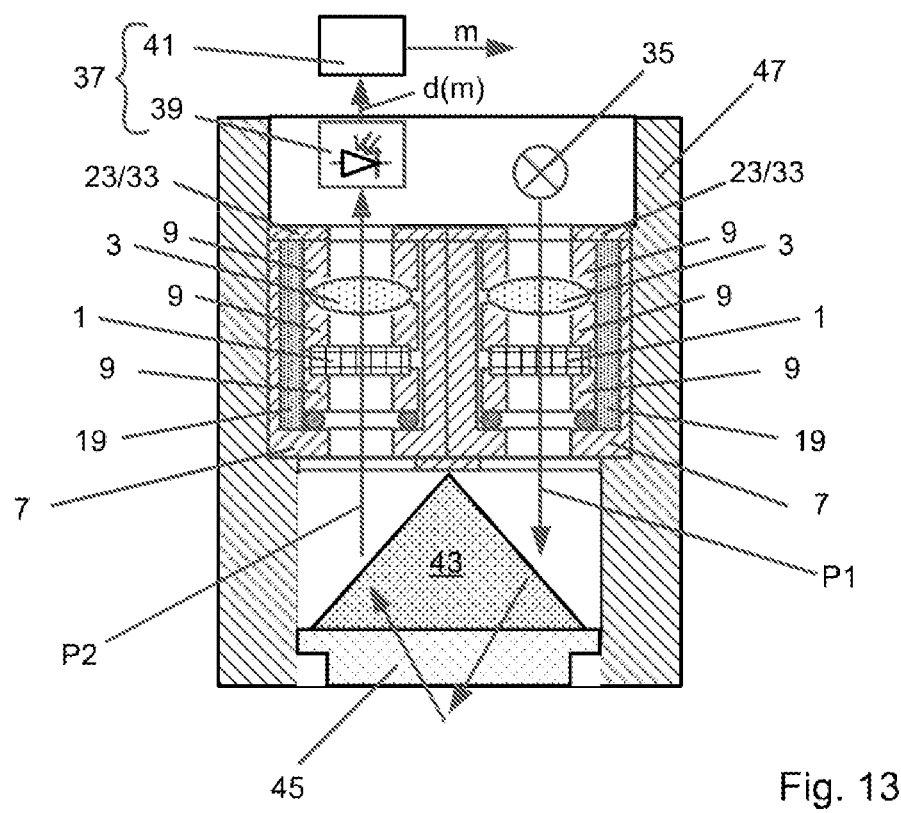
FIG. 13 shows a sensor.
Figure 14:
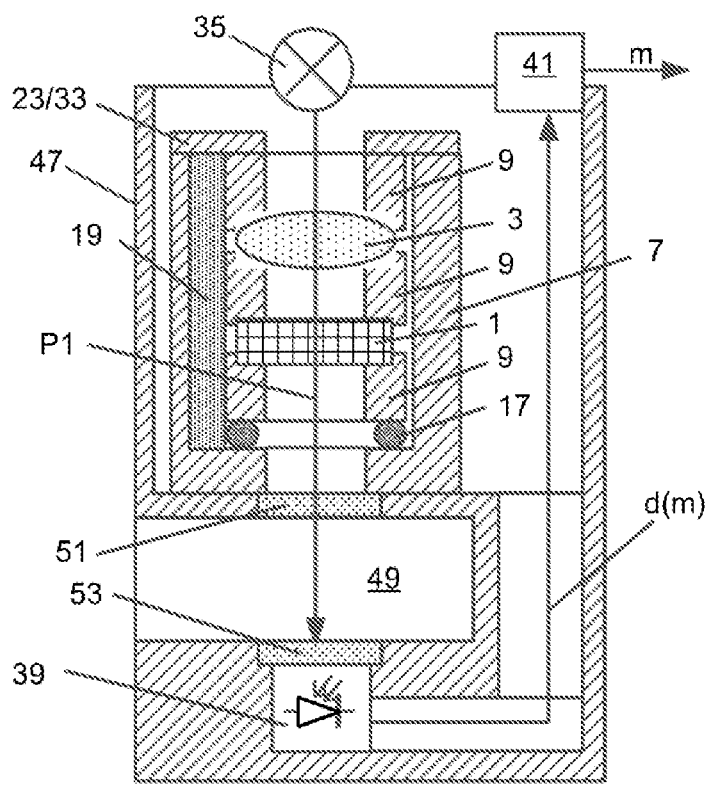
FIG. 14 shows a sensor for carrying out transmission measurements.

The sensors shown in FIGS. 13 and 14 in each case as a relevant example each comprise a transmitting device 35, such as a light source, which is designed to transmit to the medium electromagnetic transmitted radiation along an optical path P1, designed as a transmission path, and a measuring device 37 which is designed to receive measurement radiation resulting from an interaction of the transmitted radiation with the medium and, on the basis of the received measurement radiation, to determine and make available a measurement result of the measured variable. A suitable measuring device 37 is, for example, a measuring device with a detector 39, such as, for example, a photodiode, which receives the measurement radiation and outputs a detector signal d(m) which is dependent upon the measured variable. The detector signal d(m) can be provided directly as a measurement result dependent upon the measured variable. Alternatively, the measuring device 37 can also comprise measuring electronics 41 connected to the detector 39, which, on the basis of the detector signal d(m), determine a measured value of the measured variable and provide the measured value and/or a measurement signal corresponding to the measurement value as a measurement result m of the measured variable.

The sensor shown in FIG. 13 comprises two housings 7, in each of which at least one optical element 1, 3 has been installed by means of the installation method described above. One of the two housings 7 is arranged in the sensor in such a way that the optical path P1 designed as a transmission path passes through the housing 7. The other housing 7 is arranged in the sensor in such a way that an optical path P2 designed as a reception path, via which the measuring device 37 receives the measurement radiation, passes through the housing 7.

Optionally, the sensor shown in FIG. 13 is designed, for example, as a turbidity sensor for measuring the turbidity of the medium or as a sensor for measuring a solids concentration contained in the medium. In both cases, the respective measured variable is determined on the basis of the measurement radiation scattered or reflected at the particles contained in the medium. Alternatively, the sensor shown in FIG. 13 is designed, for example, as a fluorescence sensor. In this case, the interaction consists, for example, in a fluorescent component contained in the medium being excited to fluorescence by the transmitted radiation. In this embodiment, the measurement radiation is fluorescence radiation emitted by the component, and the measuring device 37 is designed to determine and output the measured variable, given here, for example, by a concentration of the fluorescent component contained in the medium, on the basis of the measurement radiation, in particular on the basis of the intensity, the spectral intensity, or the intensity spectrum of the measurement radiation.

In the sensor shown in FIG. 13, a prism 43 is inserted into the transmission path at the end, via which prism the transmission radiation arriving thereon is transmitted through an optical window 45 to the medium and via which the measurement radiation reaches the measuring device 37. This enables a beam guidance in which both optical paths P1, P2 run parallel to one another at least in sections. Accordingly, the two housings 7 are arranged in FIG. 13, for example, next to one another in an interior space of a sensor housing 47 of the sensor. Alternatively, the beam guidance of the transmitted radiation and/or of the measurement radiation can also be effected in another way.

The sensor shown in FIG. 14 is designed to carry out a transmission measurement in which the transmitted radiation is transmitted through the medium, and the measuring device 37 receives the measurement radiation emerging from the medium. For this purpose, the sensor has, for example, a recess 49, such as, for example, a measuring gap, for receiving the medium. In this case, the transmitting device 35 is arranged on one side of the recess 49, and the detector 39 of the measuring device 37 is arranged on the side, opposite the transmitting device 35, of the recess 49. In measuring operation, the transmitted radiation enters the medium located in the recess 49 through a first window 51 that delimits the recess 49, and the measurement radiation leaves the recess 49 by a second window 53, which is opposite the first window 51 on the other side of the recess 49. In this sensor, the interaction consists for example in at least part of the transmitted radiation that enters the medium being absorbed in the medium. As in the case of absorption sensors known from the prior art, with this sensor too, a measurement variable, such as a spectral absorption coefficient of the medium or a concentration of an analyte contained in the medium, for example, is also determined in that an intensity, a spectral intensity, or an intensity spectrum of the measurement radiation exiting from the medium is determined by means of the detector 39.

In the sensor shown in FIG. 14, the housing 7 with the optical elements 1, 3 installed therein by means of the installation method described above is arranged in the sensor housing 47 of the sensor such that a section of the optical path P1 designed as a transmission path passes through the housing 7.

The present disclosure is not limited to the optical sensors shown here as examples, but can also be used analogously in other optical sensors, e.g., in sensors operating on the principle of fluorescence quenching, in sensors operating on the principle of attenuated total reflection, and also in sensors for measuring a refractive index of a medium, which comprise at least one optical path into which at least one optical element is inserted.

The invention claimed is:

1. A method for installing one or more optical elements in an interior space of a housing, the method comprising:

introducing an assembly into the interior space of the housing in a centering direction extending parallel to a centering axis, wherein the assembly comprises either:
  a single element including a single optical element of the one or more optical elements to be installed in the housing; or
  two or more elements of the one or more optical elements arranged one on top of the other in a stack in the centering direction, wherein the elements arranged in the stack comprise the single or each optical element to be installed in the housing, and
clamping the assembly in the housing in at least one radial clamping direction extending perpendicular to the centering axis using at least one elastic body, in which the respective elastic body is:
  inserted in the centering direction into a recess in the housing, which recess extends parallel to the centering direction and open towards the interior space of the housing; and
  subsequently clamped such that the respective elastic body exerts a clamping force acting in the respective radial clamping direction on an outer edge of the, of at least one, or of each element of the assembly that is adjacent thereto in the interior space of the housing and which is to be clamped in the housing.

2. The method of claim 1, wherein:
the elements of the assembly comprise at least one mechanical element; and
the optical element, at least one of the optical elements, or each optical element of the one or more optical elements in the stack are each adjacent to at least one mechanical element or are arranged between two mechanical elements.

3. The method of claim 2, wherein:
the at least one or each mechanical element forms in each case one of the elements of the assembly to be clamped in the housing, which is clamped in the at least one radial clamping direction; and/or
the at least one mechanical element, between which the optical element or each of the optical elements is arranged, form the elements of the assembly to be clamped, which are clamped in each case in the at least one radial clamping direction.

4. The method of claim 1, wherein:
the housing includes a shoulder surface that extends radially inwards and surrounds on all sides externally an opening of the housing;
the assembly is arranged on the shoulder surface or on an elastic component arranged on the shoulder surface; and/or
an uppermost element of the stack, opposite the shoulder surface, is the or one of the elements of the assembly to be installed that is clamped in the at least one radial direction.

5. The method of claim 4, wherein the elastic component arranged on the shoulder surface is an O-ring seal or as a shaped seal.

6. The method of claim 1, wherein the housing includes more than one recess extending parallel to the centering direction and distributed around the centering axis, and
  wherein the assembly is clamped in three or more radial clamping directions, in that, for each radial clamping direction, each at least one elastic body is inserted into the housing in the centering direction into each of the more than one recess and is then clamped as to exert a clamping force acting in one of the radial clamping directions on the corresponding element of the assembly.

7. The method of claim 1, further comprising clamping each of the at least one elastic bodies, after insertion into a corresponding recess, using a first clamping device, which acts in the centering direction, via:
  a cover that is installed from the outside on an outer surface, which surrounds an open end of the corresponding recess;
  a displacement body inserted into an end region of the corresponding recess; or
  a pressure screw introduced into an end of the corresponding recess in a direction parallel to the centering axis.

8. The method of claim 7, further comprising subsequently clamping each of the at least one elastic bodies in the centering direction using at least one second clamping device configured to act in a radial direction perpendicular to the centering axis,
  wherein each at least one second clamping device is inserted into the housing through a housing wall of the housing at a height at which the elements of the assembly to be clamped in the housing is arranged in the interior space of the housing, and/or comprises a displacement body configured to be moved through the housing wall into the corresponding recess at the height or comprises a pressure screw configured to be screwed into the corresponding recess through the housing wall at the height.

9. The method of claim 1, further comprising:
before each respective elastic body is clamped, introducing an incompressible intermediate member into the housing on an outer side of each respective elastic body, the outer side facing away from the centering axis; and then
clamping each respective elastic body using at least one clamping device configured to act in a radial direction perpendicular to the centering axis, wherein each respective elastic body is inserted into the housing through a housing wall of the housing at a height at which the elements of the assembly to be clamped in the housing is arranged in the interior space of the housing.

10. The method of claim 9, wherein the incompressible intermediate member is a sheet metal strip.

11. The method of claim 1, wherein, for each radial clamping direction in which each element of the assembly to be clamped in the housing, a single rod-shaped, elastic body is inserted into the housing and is clamped there.

12. The method of claim 1, wherein a stack sequence of the at least one elastic body and at least one rigid body is inserted in the centering direction into the recess such that each of the at least one elastic bodies is positioned at a height of each respective element arranged in the housing to be clamped therein.

13. The method of claim 1, wherein each element of the assembly to be clamped in the housing has outer dimensions configured such that, after the insertion of the assembly into the housing, a radial distance between an outer edge of the respective element and a housing wall of the housing is between 0.05 mm to 0.5 mm.

14. The method of claim 1, wherein:
the assembly comprises at least one element configured as a mechanical element,
wherein the at least one mechanical element is configured as a spacer, a holder, and/or a surround, via a height of which, running parallel to the centering axis, an installation height of each respective optical element within the housing is adjustable, and/or via which each respective optical element is fixed in its position relative to the at least one mechanical element, and/or wherein each of the at least one mechanical element includes a central through-opening or a central through-opening that is aligned concentrically with an optical axis of each optical element, through which electromagnetic radiation can pass;

the recess is closed at one end, is configured as a guide channel which, over its axial height, is connected to the interior space of the housing via a gap extending in the centering direction, and/or is configured as a blind hole, which has been introduced into a housing wall surrounding the interior space of the housing externally such that a cross-sectional area of the blind hole includes a partial area projecting into the interior space; and/or the one or more optical elements comprise at least one optical element configured as a filter and/or at least one optical element configured as a lens.

15. The method of claim 1, wherein the assembly is held or clamped in the housing in a direction extending parallel to the centering axis using a fastening device or a cover installed on an outer surface of the housing surrounding an opening in the housing through which the assembly was inserted, which cover extends over an outer edge region of the assembly.

16. An optical sensor comprising at least one housing including at least one optical element installed in a respective housing of the at least one housing using the method according to claim 1, wherein each respective housing is arranged in the sensor such that an optical path runs through the at least one optical element arranged in the respective housing.

17. The optical sensor of claim 16, further comprising:
a transmitting device configured to transmit electromagnetic transmitted radiation along the optical path, which is adapted as a transmission path, to a medium; and
a measuring device configured to receive measurement radiation resulting from an interaction of the transmitted radiation with the medium,
wherein the optical path configured as a transmission path and/or an optical path configured as a reception path, via which the measuring device receives the measurement radiation, each run through the at least one housing.

18. The optical sensor of claim 16, wherein the optical sensor is:
a turbidity sensor;
a sensor configured to measure a solids concentration of the medium;
a fluorescence sensor;
a sensor operating according to the principle of fluorescence quenching;
a sensor operating according to the principle of attenuated total reflection and configured to perform transmission measurements as an absorption sensor;
a sensor configured to measure a spectral absorption coefficient of the medium or of a concentration of an analyte contained in the medium; or
a sensor configured to measure a refractive index of the medium.

* * * * *